Patented June 9, 1931

1,809,255

UNITED STATES PATENT OFFICE

ROLAND P. SOULE, OF NEW YORK, N. Y., ASSIGNOR TO COMBUSTION UTILITIES CORPORATION, OF NEW YORK, N. Y., A CORPORATION OF MAINE

GERMICIDE AND INSECTICIDE

No Drawing. Application filed June 11, 1924. Serial No. 719,280.

This invention relates to germicides and insecticides, and more particularly to a new and useful article of manufacture which is peculiarly adapted for use as a germicide and insecticide.

The use of oils obtained from wood tar, coke-oven tar, gas-works tar, and materials of similar nature in preparing germicides and antiseptic agents is well known. The most widely used oils for this purpose are the creosotes or acid-oils containing 10 to 25% of tar-acids such as phenol, the cresols and the xylenols. There are also used, although in much less quantity, the extracted tar-acids themselves, which are sold under the names of "phenol U. S. P.," "cresol U. S. P.," "crude cresylic acid (97-99% straw color)," "crude cresylic acid (95% dark)," etc. These crude cresylic acids constitute mixtures in varying proportions of the acids naturally occurring in the tar distillates.

The acid-oils find extensive use in the manufacture of animal dips, box-car and household disinfectants and kindred preparations. For ease in dilution such products are commonly made emulsifiable with water by mixing the acid-oils with a soap base. The extracted tar-acids are employed for somewhat different purposes. To a large extent the cresols and crude cresylic acids are made into water-soluble disinfectants of the type known as " compound solution of cresol " or " liquor cresolis compositus." Dilute aqueous solutions of pure phenol find some use as hospital antiseptics.

The cresylic acids used in preparing these various germicides may consist of a blend of the three isomeric cresols,—(boiling-points 192°, 202° and 202° centigrade) or they may contain all the tar-acids present in the low-boiling distillates and thus include not only phenol (carbolic acid) but some of the xylenols. In general however, they are characterized by their comparatively low-boiling points, i. e. they usually yield on distillation more than 5% below 200° C. and more than 95% below 215° C.

There are a number of limitations to the use of commercial carbolic and cresylic acids as disinfectants. In the first place their germicidal effect is comparatively low as compared with other commercial products such as sodium hypochlorite and similar inorganic germicides, although they are far more stable in the presence of organic matter. Furthermore they are distinctly acidic and corrosive, and they blister the skin after extended contact with it. Their use as a plant insecticide spray is precluded because of the fact that they burn the foliage. Finally they are highly toxic to animals and human beings and it is well known that carbolic acid in particular is a virulent poison.

The primary object of the present invention is to provide a germicide which is relatively inexpensive and which combines high germicidal power with stability in the presence of organic matter.

Another object of the invention is to provide a germicide which is non-corrosive, does not irritate the skin and is not poisonous to animal life.

Another object of the invention is to provide an insecticide which does not burn plant foliage and which is highly poisonous to certain lower forms of life but non-toxic to animals and human beings.

With these and other objects in view, the invention consists in the germicidal and insecticidal composition hereinafter described and particularly defined in the claims.

The article of manufacture forming the subject of the present invention can be prepared from the liquid products of distillation of coal or other bituminous material, provided that the conditions of the distillation are sufficiently mild to preserve these liquid products in their primary state, e. g. substantially unaltered in composition and largely protected from secondary decompositions into compounds of the aromatic series. In the patent to Henry L. Doherty, No. 1,426,159 granted Aug. 15, 1922, and in the British patent of Henry O. Loebell 216,488 of May 23, 1923, two gas-making processes are described by either of which fuel is distilled under such mild conditions as to produce substantially primary tar. In these processes the fuel is slowly passed downwardly through a shaft furnace in which it is heated and distilled solely by sensible heat supplied by a rising current of hot gases. By passing this gas current in a direction opposed to that in which the fuel is advancing the fuel is heated gradually and the gas is correspondingly cooled through the transfer of its heat. This method of operation results in exceedingly mild conditions of distillation and carbonization, since the volatile products distilled from the coal are mixed with and carried off by the current of heating gas rising through the upper and cooler portions of the charge. Thus the tar vapors are not exposed to temperatures much above those at which they are first liberated, and therefore are almost completely preserved in their primary composition.

This primary tar is clearly distinguishable both in chemical and physical properties from ordinary tars produced at the high temperatures of the coke-oven or gas-works. For example the primary tar has a petroleum-like fluidity and when warm has a viscosity much lower than that of ordinary coke-oven tar at the same temperature. Moreover its specific gravity, "free carbon" content, and yield of pitch of the same melting point are also much lower. It is the chemical properties of this primary tar, however, that most clearly distinguish it from coke-oven tar. Thus a 30% volatile coal produces a primary tar containing about one-fourth its weight of tar-acids or alkali soluble compounds, but yields in the coke oven only about one-half this weight of tar containing less than 5% of phenols. The primary tar-acids consist principally of high-boiling organic hydroxy compounds of which at least 50% distil above 220° C., whereas the corresponding alkali-soluble compounds of coke-oven tar are usually composed of about one-fourth of phenol, one-half of cresols and one-fourth of the higher-boiling tar-acids. Furthermore the neutral oils of this primary tar consist largely in cyclic hydroaromatic non-benzenoid hydrocarbons, both saturated and unsaturated, and contain a relatively small proportion of aromatic hydrocarbons, of which coke-oven tar is principally composed. Thus it is obvious that the primary tar under consideration is characterized by its very large content of high-boiling tar-acids or alkali soluble bodies, and by its very small content of aromatic hydrocarbons.

A distillation to soft pitch of a sample of primary or only partially decomposed primary tar such as that obtained by fractionally distilling a bituminous coal containing 30% volatile matter by the Doherty or Loebell processes has yielded, for example, a distillate comprising about 60% by weight of the original body of tar, and this distillate has been found to contain 28% primary tar acids, 2% nitrogen bases, 4% paraffins, 9% naphthenes and 57% cyclic unsaturated non-benzenoid hydrocarbons. Aromatic hydrocarbons were not found in more than traces. At least 50% of the primary tar acids in this distillate boiled above 220° C., whereas most of the phenols of coke-oven tar distil below this temperature. These primary tar-acids are further distinguished by the fact that they consist in large part of components which may be regarded as alkali-soluble hydroxy derivatives of cyclic unsaturated non-benzenoid hydrocarbons. This constitutional difference between the primary tar-acids and ordinary phenols is indicated by the lower density and refractive index of fractions of the same boiling point.

The distillates of this primary or only partially decomposed primary tar and/or the tar-acids, extracted from such distillates either with or without a soap base, have been found to possess properties which make them exceptionally valuable as germicides and insecticides. Accordingly, the subject of the present invention may be described as consisting essentially of compositions containing or prepared from alkali-soluble organic hydroxy compounds or primary tar acids of a boiling point much higher than that of cresylic acid. These primary tar acids are not simply the higher phenolic homologues such as occur in small quantities in ordinary coke-oven tar, but differ from them by having a lower density for the same boiling point (being partially hydrogenated and having more aliphatic side chains), and they are far superior as germicides to those containing chiefly ordinary phenols and cresols for the reasons hereinafter stated.

The high-boiling primary tar acids have a lower acidity and hence a decreased tendency to corrode metals and blister the skin. This property follows naturally from the chemical inertness normally associated with high molecular weight. Thus in any homologous series of compounds chemical activity and solubility are usually at a maximum with the lowest member and decrease rapidly with a rise in molecular weight.

The high-boiling primary tar acids have a lower toxicity to animals and human beings. The average toxicity of the whole range of such tar-acids extracted from the distillate of a primary tar is less than one-fifth that of phenol or carbolic acid. It is evident that this property is of great value in a household disinfectant which, if poisonous, is a distinct hazard. The high toxicity of the coal tar disinfectants now on the market has militated against their wide use in homes and hospitals. Moreover in animal dips where the Government forbids the use of carbolic acid because of its poisonous nature, low toxicity is of great advantage.

The strong germicidal action of the disinfectants containing these primary tar acids is one of their greatest assets. In comparing the germicidal powers of various disinfectants against typhus bacteria, phenol or carbolic acid is given the arbitrary value of unity. By determining the relative killing concentrations, it has been found that the cresols are more than twice as effective and hence they have been given a relative value or phenol coefficient of two to three. Tests have been made of the three equal and successive fractions obtained by distilling the high-boiling primary tar acids extracted from the entire distillate of a primary tar, and it has been found that the phenol coefficients of these fractions are respectively 12 to 14; 17 to 19; and 23 to 26; the highest values referring to the highest-boiling fraction. Moreover these high-boiling tar-acids volatilize less readily, and accordingly the germicidal value of disinfectants containing them is not lowered so rapidly by reason of their evaporation when exposed to the air. Thus the properties of these products as germicides clearly show them to be a distinct improvement over cresylic acid, the most widely used of the disinfectant phenols.

The high-boiling primary tar acids also have properties which adapt them to the manufacture of plant and household insecticides. By reacting an alkaline substance such as the hydroxides of sodium, calcium, barium, or other alkalies or alkaline earths with fractions of such primary tar-acids, salts can be produced which possess insecticidal powers substantially equal to those of the original phenol-like compounds. These salts can conveniently be applied to plants as dust, and being neutral compounds do not burn the foliage. As household insecticides they can be admixed at the discretion of the manufacturer with molasses or other baits to attract roaches and similar pests.

Accordingly the composition comprising the new germicide and insecticide which is the subject of the present invention, consists substantially of a mixture containing or derived from the high-boiling primary tar acids which are present in the primary or only partially decomposed liquid distillates of coal or other bituminous material. The composition may consist entirely of such primary tar acids, the alkali or alkaline earth (alkaline-base-forming metal) salts of such compounds, or it may be admixed with neutral oils and/or soap bases.

The soap bases commonly mixed with acid-oils or the extracted tar-acids are produced by reacting caustic soda or caustic potash with rosin, linseed oil, castor oil, "red oil" (oleic acid) or similar products. In thus compounding disinfectant oils the soap base acts as an agent by means of which the substantially insoluble mixture of the primary tar acids is disseminated in the form of a solution or stable aqueous emulsion. Soaps made from caustic potash and linseed oil are commonly mixed with extracted tar-acids to produce water-soluble disinfectants of the type of "compound solution of cresol". Soaps made from caustic soda and rosin are commonly mixed with acid-oils of various strength to produce emulsifiable disinfectants. By such means the antiseptic properties of the oils are more economically utilized and in addition the disinfectant can be employed as a cleansing agent.

The following description is offered as an example of the procedure to be followed in preparing specific emulsifiable disinfectants of the character comprising the subject of the present invention. A primary tar obtained by the mild carbonization or Elkhorn coal in accordance with the process described in the aforementioned British patent to Loebell 216,488, May 23, 1923, is distilled to an end point at which a pitch residue of about 150° F. melting point is obtained. The distillate formed comprises by volume about 50% of the original primary tar and contains by volume upwards of 25% of primary tar acids of the class referred to. To twenty grams of this distillate there is added 7.2 grams of rosin soap (sodium resinate) dissolved in 4.4 cc. of water, giving a composition equivalent to a solution comprising one gallon of the distillate, 3.1 pounds of rosin soap, and 2.3 gallons of water. The mixture is heated, stirred and agitated until the constituents are thoroughly intermingled, and is then allowed to cool, forming a clear solution. This mixture constitutes the concentrated disinfectant and it can be diluted with water to give a stable emulsion of any desired concentration of primary tar acids. A disinfectant can be likewise prepared using only the tar acid fraction of the primary tar distillate used in the preceding example, the proportions of the various ingredients employed being 20 grams of the mixed primary tar acids constituting the tar acid fraction of the distillate above referred to, 20 grams of yellow rosin, and 12 cc. of aqueous sodium hydroxide solution of such concentration that it contains 200 grams of sodium hydroxide per liter of solution.

Primary or only partially decomposed primary tar, its distillates, or a mixture of its distillates with the primary tar and/or with petroleum oil or similar materials, have been found to possess properties which make them distinctly advantageous for use as wood-preserving oils.

In the specification the terms and in the claims the term primary tar acids has been adopted as best describing the mixture of high-boiling alkali-soluble organic hydroxy compounds which are present in such primary or only partially decomposed primary tar. It is to be understood, therefore, that the term primary tar acids as used in the claims is a generic term for compounds which structurally may be regarded as the alkali-soluble hydroxy derivatives of cyclic unsaturated non-benzenoid hydrocarbons.

The composition comprising the subject-matter of the present invention having been thus described, what is claimed as new is:

1. A germicide and insecticide containing a distillate of a primary or only partially decomposed primary tar, characterized by the presence of primary tar acids of which at least 50% distil above 220° C., together with a soap base.

2. A germicide and insecticide comprising primary tar acids.

3. A germicide and insecticide comprising a mixture of primary tar acids of which at least 50% distil above 220° C.

4. A germicide and insecticide comprising a permanent aqueous emulsion of primary tar acids.

5. A germicide and insecticide comprising a permanent aqueous emulsion of primary tar acids of which at least 50% distil above 220° C.

6. A germicide and insecticide comprising a soap base emulsion in water of a mixture of primary tar acids and a hydrocarbon oil.

7. A germicide and insecticide comprising a soap base emulsion in water of a primary tar distillate.

8. A germicide and insecticide comprising a permanent aqueous emulsion of primary tar acids of which at least 50% distil above 220° C., and a hydrocarbon oil.

9. A germicide and insecticide comprising an alkaline base-forming metal salt of primary tar acids.

10. A germicide and insecticide comprising alkaline base-forming metal salts of a mixture of primary tar acids of which at least 50% distil above 220° C.

11. A germicide and insecticide comprising the reaction product of a hydroxid of an alkaline base-forming metal with a tar acid fraction of a primary tar distillate.

In testimony whereof I affix my signature.

ROLAND P. SOULE.